(12) United States Patent
Erben et al.

(10) Patent No.: US 7,897,296 B2
(45) Date of Patent: *Mar. 1, 2011

(54) METHOD FOR HOLOGRAPHIC STORAGE

(75) Inventors: Christoph Georg Erben, Clifton Park, NY (US); Eugene Pauling Boden, Scotia, NY (US); Michael Jeffrey McLaughlin, Albany, NY (US)

(73) Assignee: General Electric Company, Niskayuna, NY (US)

( * ) Notice: Subject to any disclaimer, the term of this patent is extended or adjusted under 35 U.S.C. 154(b) by 928 days.

This patent is subject to a terminal disclaimer.

(21) Appl. No.: 10/954,779

(22) Filed: Sep. 30, 2004

(65) Prior Publication Data

US 2006/0073392 A1  Apr. 6, 2006

(51) Int. Cl.
*G03H 1/02* (2006.01)

(52) U.S. Cl. .................... 430/1; 430/2; 359/3; 359/4

(58) Field of Classification Search .................. None
See application file for complete search history.

(56) References Cited

U.S. PATENT DOCUMENTS

| | | | |
|---|---|---|---|
| 3,416,922 A * | 12/1968 | Oskar et al. ............. 430/270.1 |
| 3,635,544 A * | 1/1972 | Stamm et al. ................ 359/241 |
| 3,635,895 A | 1/1972 | Kramer et al. | |
| 3,658,543 A | 4/1972 | Gerlach, Jr. et al. | |
| 3,850,633 A | 11/1974 | Moraw et al. | |
| 3,968,051 A * | 7/1976 | Stamm et al. ................ 252/586 |
| 3,988,159 A * | 10/1976 | Schlesinger ............... 430/495.1 |
| 3,989,530 A * | 11/1976 | Robillard .......................... 430/1 |
| 4,001,184 A | 1/1977 | Scott | |
| 4,217,438 A | 8/1980 | Brunelle et al. | |
| 4,286,957 A * | 9/1981 | Le Naour-Sene .................. 8/471 |
| 4,367,170 A * | 1/1983 | Uhlmann et al. ............. 252/586 |
| 4,578,344 A | 3/1986 | Griffing et al. | |
| 4,623,611 A | 11/1986 | West | |
| 4,661,433 A | 4/1987 | Davis | |
| 4,663,275 A | 5/1987 | West et al. | |
| 4,667,049 A | 5/1987 | Heikkila et al. | |
| 4,702,996 A | 10/1987 | Griffing et al. | |
| 4,709,107 A | 11/1987 | West et al. | |
| 4,737,449 A | 4/1988 | Heller et al. | |
| 4,784,474 A * | 11/1988 | Yamamoto et al. ........... 359/241 |

(Continued)

FOREIGN PATENT DOCUMENTS

CA  2 365 934  9/2000

(Continued)

OTHER PUBLICATIONS

Lafond et al., holographic charachterization of fulgides doper polymer films, Proc. SPIE vol. 4833 pp. 584-590 (2002).*

(Continued)

*Primary Examiner* — Martin J Angebranndt
(74) *Attorney, Agent, or Firm* — Joseph J. Christian

(57) ABSTRACT

Disclosed herein is a method of manufacturing a data storage media comprising mixing a photochromic dye with an organic material or an inorganic material to form a holographic composition; and molding the holographic composition into holographic data storage media. Disclosed herein too is an article comprising a photochromic dye and an organic material, wherein the article is used as a data storage media. Disclosed herein too is a method for recording information comprising irradiating an article that comprises a photochromic dye; wherein the irradiation is conducted with electromagnetic energy having a wavelength of about 350 to about 1,100 nanometers; and reacting the photochromic dye.

18 Claims, 3 Drawing Sheets

U.S. PATENT DOCUMENTS

| | | |
|---|---|---|
| 4,859,789 A | 8/1989 | Griffing et al. |
| 4,897,829 A * | 1/1990 | Ikoma et al. ............... 369/288 |
| 4,920,220 A | 4/1990 | Phaff |
| 4,990,665 A | 2/1991 | Griffing et al. |
| 4,992,347 A * | 2/1991 | Hawkins et al. ............... 430/10 |
| 5,002,993 A | 3/1991 | West et al. |
| 5,023,859 A | 6/1991 | Eich et al. |
| 5,037,861 A | 8/1991 | Crivello et al. |
| 5,064,264 A | 11/1991 | Ducharme et al. |
| 5,102,771 A * | 4/1992 | Vogel et al. ............... 430/270.1 |
| 5,106,723 A | 4/1992 | West et al. |
| 5,108,874 A | 4/1992 | Griffing et al. |
| 5,169,962 A | 12/1992 | Crivello et al. |
| 5,173,381 A | 12/1992 | Natansohn et al. |
| 5,176,983 A * | 1/1993 | Horn et al. ............... 430/270.1 |
| 5,177,218 A | 1/1993 | Fischer et al. |
| 5,177,227 A | 1/1993 | Fischer et al. |
| 5,178,978 A * | 1/1993 | Zanoni et al. ............... 430/11 |
| 5,206,395 A | 4/1993 | Fischer et al. |
| 5,208,354 A | 5/1993 | Fischer et al. |
| 5,219,710 A * | 6/1993 | Horn et al. ............... 430/270.1 |
| 5,246,989 A | 9/1993 | Iwamoto et al. |
| 5,253,198 A * | 10/1993 | Birge et al. ............... 365/106 |
| 5,260,399 A | 11/1993 | Crivello et al. |
| 5,260,999 A | 11/1993 | Wyman |
| 5,268,862 A | 12/1993 | Rentzepis |
| 5,325,324 A | 6/1994 | Rentzepis et al. |
| 5,328,994 A | 7/1994 | Berneth et al. |
| 5,349,065 A | 9/1994 | Tanaka et al. |
| 5,384,221 A | 1/1995 | Savant et al. |
| 5,387,698 A | 2/1995 | Crivello et al. |
| 5,407,885 A | 4/1995 | Fischer et al. |
| 5,438,439 A | 8/1995 | Mok et al. |
| 5,440,669 A | 8/1995 | Rakuljic et al. |
| 5,442,026 A | 8/1995 | Crivello et al. |
| 5,443,940 A | 8/1995 | Tatezono et al. |
| 5,450,218 A | 9/1995 | Heanue et al. |
| 5,460,907 A | 10/1995 | Ducharme et al. |
| 5,488,119 A | 1/1996 | Fischer-Reimann et al. |
| 5,523,374 A | 6/1996 | Bard et al. |
| 5,563,298 A | 10/1996 | Weitzel et al. |
| 5,583,194 A | 12/1996 | Crivello et al. |
| 5,604,002 A | 2/1997 | Tsujioka et al. |
| 5,623,040 A | 4/1997 | Fischer et al. |
| 5,641,846 A | 6/1997 | Bieringer et al. |
| 5,719,690 A | 2/1998 | Burland et al. |
| 5,744,280 A | 4/1998 | Mooney, III et al. |
| 5,759,447 A | 6/1998 | Efron et al. |
| 5,759,721 A | 6/1998 | Dhal et al. |
| 5,851,585 A * | 12/1998 | Gupta et al. ............... 427/162 |
| 5,858,585 A | 1/1999 | Haarer et al. |
| 5,889,751 A * | 3/1999 | Tsujioka et al. ............... 369/116 |
| 5,978,112 A | 11/1999 | Psaltis et al. |
| 6,046,290 A | 4/2000 | Berneth et al. |
| 6,046,925 A | 4/2000 | Tsien et al. |
| 6,090,332 A | 7/2000 | Marder et al. |
| 6,091,879 A * | 7/2000 | Chan et al. ............... 385/143 |
| 6,124,076 A | 9/2000 | Dhar et al. |
| 6,221,536 B1 | 4/2001 | Dhar et al. |
| 6,267,913 B1 | 7/2001 | Marder et al. |
| 6,322,931 B1 | 11/2001 | Cumpston et al. |
| 6,402,037 B1 | 6/2002 | Prasad et al. |
| 6,423,799 B1 | 7/2002 | Berneth et al. |
| 6,432,610 B1 | 8/2002 | Rentzepis et al. |
| 6,441,113 B1 | 8/2002 | Berneth et al. |
| 6,482,551 B1 | 11/2002 | Dhar et al. |
| 6,483,735 B1 | 11/2002 | Rentzepis |
| 6,492,468 B1 | 12/2002 | Chen et al. |
| 6,501,571 B1 | 12/2002 | Wang et al. |
| 6,512,606 B1 | 1/2003 | Lipson et al. |
| 6,627,354 B1 | 9/2003 | Chandross et al. |
| 6,650,447 B2 | 11/2003 | Curtis et al. |
| 6,733,950 B2 | 5/2004 | Breitung et al. |
| 6,743,552 B2 | 6/2004 | Setthachayanon et al. |
| 6,784,300 B2 | 8/2004 | Cetin et al. |
| 7,012,802 B2 * | 3/2006 | Nakajima et al. ............... 361/683 |
| 2002/0163873 A1 | 11/2002 | Kawano et al. |
| 2003/0022105 A1 | 1/2003 | Prasad et al. |
| 2003/0028019 A1 * | 2/2003 | Momoda et al. ............... 544/150 |
| 2003/0044691 A1 | 3/2003 | Setthachayanon et al. |
| 2003/0086978 A1 | 5/2003 | Kim et al. |
| 2003/0129408 A1 | 7/2003 | Thompson et al. |
| 2003/0183959 A1 | 10/2003 | Berneth et al. |
| 2003/0191240 A1 | 10/2003 | Berneth et al. |
| 2003/0199603 A1 | 10/2003 | Walker et al. |
| 2003/0206320 A1 | 11/2003 | Cole et al. |
| 2003/0224250 A1 | 12/2003 | Setthachayanon et al. |
| 2004/0067433 A1 | 4/2004 | Nirmal et al. |
| 2004/0072100 A1 | 4/2004 | Mizokuro et al. |
| 2004/0137188 A1 | 7/2004 | Lindholm et al. |
| 2004/0178394 A1 * | 9/2004 | Tanaka et al. ............... 252/586 |
| 2004/0214106 A1 | 10/2004 | Berneth et al. |
| 2006/0078802 A1 * | 4/2006 | Chan et al. ............... 430/1 |
| 2007/0097469 A1 * | 5/2007 | Erben et al. ............... 359/3 |
| 2007/0127329 A1 * | 6/2007 | Erben et al. ............... 369/44.26 |
| 2007/0146835 A1 * | 6/2007 | Erben et al. ............... 359/3 |
| 2007/0147214 A1 * | 6/2007 | Erben et al. ............... 369/103 |
| 2007/0178404 A1 * | 8/2007 | Brodsky et al. ............... 430/270.1 |
| 2008/0055686 A1 * | 3/2008 | Erben et al. ............... 359/4 |
| 2008/0084592 A1 * | 4/2008 | Boden et al. ............... 359/2 |
| 2008/0085455 A1 * | 4/2008 | McLaughlin et al. ............... 430/1 |

FOREIGN PATENT DOCUMENTS

| | | |
|---|---|---|
| CA | 2 366 846 | 9/2000 |
| EP | 0566233 | 10/1993 |
| GB | 2 002 752 A | 7/1978 |
| WO | WO 9836298 A1 * | 8/1998 |
| WO | WO99/26112 | 5/1999 |
| WO | 01/37266 | 5/2001 |
| WO | WO02/19040 A2 | 3/2002 |
| WO | 02/102923 * | 12/2002 |

OTHER PUBLICATIONS

Liu et al. Chin. Phys. Lett., vol. 20(7) pp. 1051-1053 (Jul. 2003).*

Kada et al., 'Fabrication of refractive index distributions in polymer using a photochemical reaction', J. Appl. Phys., vol. 87(2) pp. 638-642 (Jan. 2000).*

Todorov et al., 'Photochromism and dynamic . . . ', Opt. & Quantum Elec. vol. 13 pp. 209-215 (1981).*

Tork et al., Photochromic behavior of spiropyran in polymer matrices, Appl. Opt., vol. 40(8) pp. 1180-1186 (Mar. 2001).*

Hsu et al., 'Experimental characterization of phenanthreenquinone doped . . . ', Opt. Eng., vol. 42(5) pp. 1390-1396 (May 2003).*

Duelli et al., Colorant doped polymethylmethacrylate used as a holographic . . . , Pure Appl. Opt., vol. 3 pp. 215-220 (1994).*

Smets et al.,., 'Influence of rigid polymer matrices on the reversible . . . ', J. Poly. Sci . . . : Poly. Chem Ed., vol. 14 p. 2983-2994 (1976).*

Bian et al., 'Erasable gholographic recording . . . ' Opt. Lett., vol. 28(11) pp. 929-931 (Jun. 2003).*

Horn et al. "Polymeric materials for guided wave devices" Proc. SPIE vol. 1337 pp. 195-202 (1990).*

Tanaka et al. "photocontrol of the refractive . . . " J. Appl. Polymer. Sci., vol. 93 pp. 2517-2520 (Jul. 2004).*

Dewentabstrct for DE 1447010 (1974) 2 pages.*

Abstract for WO01/26105 Publication Date Apr. 12, 2001.

Iain A. McCulloch "Novel Photoactive Nonlinear Optical Polymers for Use in Optical Waveguides" Macromolecules, 1994, 27, 1697-1702.

Yugi Kubo et al. "Synthesis and Characteristics of Near-Infrared Absorbing Metal Complex Dyes with Indoaniline-type Ligands", Chemistry Letters, 1987, pp. 1563-1566.

Mark M. Wang et al. "Three-dimensional Optical Data Storage in a Fluorescent Dye-doped Photopolymer", Applied Optics, vol. 39, No. 11, Apr. 10, 2000.

Janet S. Splitter et al. "The Photochemical Behavior of Some o-Nitrostilbenes", Contribution from the Department of Chemistry and Radiation Laboratory, University of California, Apr. 11, 1955, pp. 1086-1115.

Masahiro Irie "Diarylethenes for Memories and Switches" Chem. Rev. 2000, 100, 1685-1716.

U.S. Appl. No. 10/826,837, filed Apr. 16, 2004, Boden et al., Novel Optical Storage Materials, Methods of Making the Storage Materials, and Methods for Storing and Reading Data.

U.S. Appl. No. 10/964,092, filed Oct. 13, 2004, Chan et al., Holographic Storage Medium.

U.S. Appl. No. 10/869,143, filed Jun. 15, 2004, McLaughlin et al., Holographic Storage Medium.

U.S. Appl. No. 10/742,461, filed Dec. 19, 2003, Novel Optical Storage Materials Based on Narrowband Optical Properties.

PCT Search Report dated Jan. 2, 2006.

* cited by examiner

METHOD FOR HOLOGRAPHIC STORAGE

BACKGROUND

The present disclosure relates to optical data storage media, and more particularly, to holographic storage mediums as well as methods of making and using the same.

Holographic storage is the data storage of holograms, which are images of three dimensional interference patterns created by the intersection of two beams of light, in a photosensitive medium. The superposition of a reference beam and a signal beam, containing digitally encoded data, forms an interference pattern within the volume of the medium resulting in a chemical reaction that changes or modulates the refractive index of the medium. This modulation serves to record as the hologram both the intensity and phase information from the signal. The hologram can later be retrieved by exposing the storage medium to the reference beam alone, which interacts with the stored holographic data to generate a reconstructed signal beam proportional to the initial signal beam used to store the holographic image.

Each hologram may contain anywhere from one to $1 \times 10^6$ or more bits of data. One distinct advantage of holographic storage over surface-based storage formats, including CDs or DVDs, is that a large number of holograms may be stored in an overlapping manner in the same volume of the photosensitive medium using a multiplexing technique, such as by varying the signal and/or reference beam angle, wavelength, or medium position. However, a major impediment towards the realization of holographic storage as a viable technique has been the development of a reliable and economically feasible storage medium.

Early holographic storage media employed inorganic photorefractive crystals, such as doped or undoped lithium niobate ($LiNbO_3$), in which incident light creates refractive index changes. These index changes are due to the photo-induced creation and subsequent trapping of electrons leading to an induced internal electric field that ultimately modifies the index through a linear electro-optic effect. However, $LiNbO_3$ is expensive, exhibits relatively poor efficiency, fades over time, and requires thick crystals to observe any significant index changes.

More recent work has led to the development of polymers that can sustain larger refractive index changes owing to optically induced polymerization processes. These materials, which are referred to as photopolymers, have significantly improved optical sensitivity and efficiency relative to $LiNbO_3$ and its variants. In prior art processes, "single-chemistry" systems have been employed, wherein the media comprise a homogeneous mixture of at least one photoactive polymerizable liquid monomer or oligomer, an initiator, an inert polymeric filler, and optionally a sensitizer. Since it initially has a large fraction of the mixture in monomeric or oligomeric form, the medium may have a gel-like consistency that necessitates an ultraviolet (UV) curing step to provide form and stability. Unfortunately, the UV curing step may consume a large portion of the photoactive monomer or oligomer, leaving significantly less photoactive monomer or oligomer available for data storage. Furthermore, even under highly controlled curing conditions, the UV curing step may often result in variable degrees of polymerization and, consequently, poor uniformity among media samples.

Thus, there remains a need for improved polymer systems suitable for holographic data storage media. In particular it would be advantageous for the data storage media to be written and read at the same wavelength without any degradation of the stored data.

SUMMARY

Disclosed herein is a method of manufacturing a data storage media comprising mixing a photochromic dye with an organic material or an inorganic material to form a holographic composition; and molding the holographic composition into holographic data storage media.

Disclosed herein too is an article comprising a photochromic dye and an organic material, wherein the article is used as a data storage media.

Disclosed herein too is a method for recording information comprising irradiating an article that comprises a photochromic dye; wherein the irradiation is conducted with electromagnetic energy having a wavelength of about 350 to about 1,100 nanometers; and reacting the photochromic dye.

Disclosed herein too is a method for using a holographic data storage media comprising irradiating an article that comprises a photochromic dye; wherein the irradiation is conducted with electromagnetic energy having a first wavelength and wherein the irradiating that is conducted at the first wavelength facilitates the storage of data; reacting the photochromic dye; and irradiating the article at a second wavelength to read the data.

Disclosed herein too is a method of manufacturing a holographic data storage media comprising disposing a layer of a photoactive material upon a surface of a first film; wherein the photoactive material comprises a photochromic dye; and disposing a second film upon a surface of the photoactive material opposed to the surface in contact with the first film.

DESCRIPTION OF THE FIGURES

Referring now to the figures, which are exemplary embodiments and wherein like elements are numbered alike.

DETAILED DESCRIPTION

Figure 1A:
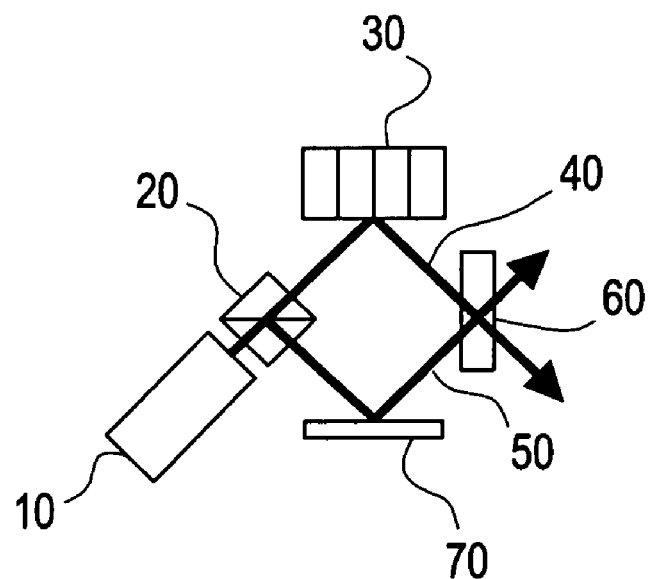
FIG. 1 is a schematic representation of a holographic storage setup for (a) writing data and (b) reading stored data.

Disclosed herein are optical data storage media for use in holographic data storage and retrieval. Also disclosed are methods directed to holographic storage media preparation, data storage, and data retrieval. The holographic storage media is manufactured from a holographic composition that comprises a binder composition and a photoactive material, wherein the photoactive material comprises a photochromic dye. The photochromic dye comprises a diarylethene, a nitrone, or a combination of a diarylethene and a nitrone. The holographic storage media can be advantageously used for data storage. The holographic storage media can also be written and read (i.e., data can be stored and retrieved respectively) using electromagnetic radiation having the same wavelength.

The binder composition can comprise an inorganic material, an organic material or a combination of an inorganic material with an organic material. Examples of suitable inorganic materials are silica (glass), alumina, or the like, or a combination comprising at least one of the foregoing inorganic materials.

Exemplary organic materials employed in the binder composition are optically transparent organic polymers. The organic polymer can be a thermoplastic polymer, a thermosetting polymer, or a combination of a thermoplastic polymer with a thermosetting polymer. The organic polymers can be oligomers, polymers, dendrimers, ionomers, copolymers such as for example, block copolymers, random copolymers, graft copolymers, star block copolymers; or the like, or a combination comprising at least one of the foregoing polymers. Examples of suitable thermoplastic organic polymers that can be used in the binder composition are polyacrylates, polymethacrylates, polyesters, polyolefins, polycarbonates, polystyrenes, polyesters, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyether amides, polyether esters, or the like, or a combination comprising at least one of the foregoing thermoplastic polymers.

Organic polymers that are not transparent to electromagnetic radiation can also be used in the binder composition if they can be modified to become transparent. For examples, polyolefins are not normally optically transparent because of the presence of large crystallites and/or spherulites. However, by copolymerizing polyolefins, they can be segregated into nanometer-sized domains that cause the copolymer to be optically transparent.

In one embodiment, the organic polymer can be chemically attached to the photochromic dye. The photochromic dye can be attached to the backbone of the polymer. In another embodiment, the photochromic dye can be attached to the polymer backbone as a substituent. The chemical attachment can include covalent bonding, ionic bonding, or the like.

Suitable organic polymers for use in the binder composition of the data storage devices are polycarbonates, cycloaliphatic polyesters, resorcinol arylate polyesters, as well as blends and copolymers of polycarbonates with polyesters. As used herein, the terms "polycarbonate", "polycarbonate composition", and "composition comprising aromatic carbonate chain units" includes compositions having structural units of the formula (I):

(I)

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$$-A^1-Y^1-A^2-$$ (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another embodiment, zero atoms separate $A^1$ from $A^2$, with an illustrative example being biphenyl. The bridging radical $Y^1$ can be a saturated hydrocarbon group such as methylene, cyclohexylidene or isopropylidene.

Polycarbonates can be produced by the interfacial or melt reactions of dihydroxy compounds in which only one atom separates $A^1$ and $A^2$. As used herein, the term "dihydroxy compound" includes, for example, bisphenol compounds having general formula (III) as follows:

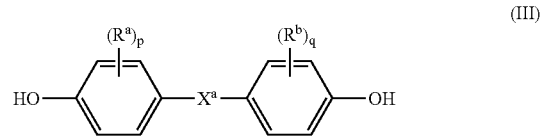

(III)

wherein $R^a$ and $R^b$ each independently represent hydrogen, a halogen atom, preferably bromine, or a monovalent hydrocarbon group; p and q are each independently integers from 0 to 4; and $X^a$ represents one of the groups of formula (IV):

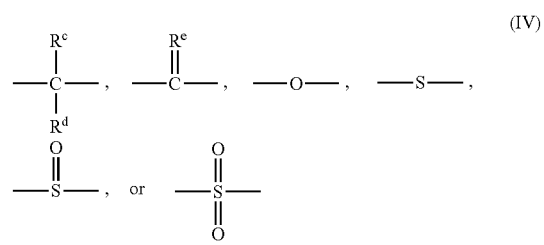

(IV)

wherein $R^c$ and $R^d$ each independently represent a hydrogen atom or a monovalent linear or cyclic hydrocarbon group, and $R^e$ is a divalent hydrocarbon group, oxygen, or sulfur.

Examples of the types of bisphenol compounds that may be represented by formula (III) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, or the like; bis (hydroxyaryl)cycloalkane series such as, 1,1-bis(4-hydroxyphenyl)cyclopentane, 1,1-bis(4-hydroxyphenyl) cyclohexane, or the like, or combinations comprising at least one of the foregoing bisphenol compounds.

Other bisphenol compounds that may be represented by formula (III) include those where X is —O—, —S—, —SO— or —S(O)$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl)sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other bisphenol compounds that may be utilized in the polycondensation of polycarbonate are represented by the formula (V)

(V)

wherein, $R^f$, is a halogen atom or a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (V), are resorcinol, substituted resorcinol compounds such as 5-methyl resorcin, 5-ethyl resorcin, 5-propyl resorcin, 5-butyl resorcin, 5-t-butyl resorcin, 5-phenyl resorcin, 5-cumyl resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, or the like; or combinations comprising at least one of the foregoing bisphenol compounds.

Bisphenol compounds such as 2,2,2',2'-tetrahydro-3,3,3',3'-tetramethyl-1,1'-spirobiindane-6,6'-diol represented by the following formula (VI) may also be used.

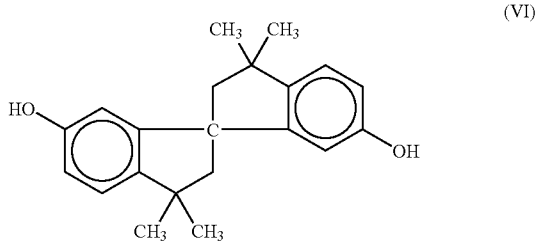

(VI)

Suitable polycarbonates further include those derived from bisphenols containing alkyl cyclohexane units. Such polycarbonates have structural units corresponding to the formula (VII)

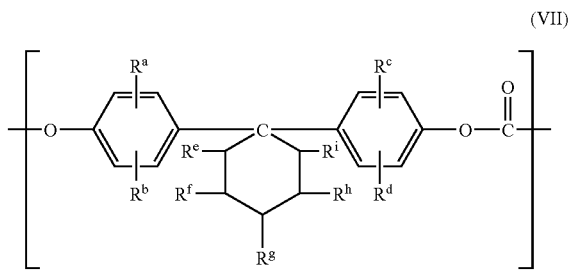

(VII)

wherein $R^a$-$R^d$ are each independently hydrogen, $C_1$-$C_{12}$ hydrocarbyl, or halogen; and $R^e$-$R^i$ are each independently hydrogen, $C_1$-$C_{12}$ hydrocarbyl. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. Alkyl cyclohexane containing bisphenols, for example the reaction product of two moles of a phenol with one mole of a hydrogenated isophorone, are useful for making polycarbonate resins with high glass transition temperatures and high heat distortion temperatures. Such isophorone bisphenol-containing polycarbonates have structural units corresponding to the formula (VIII)

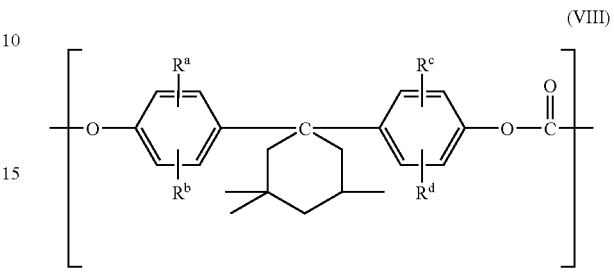

(VIII)

wherein $R^a$-$R^d$ are as defined above. These isophorone bisphenol based resins, including polycarbonate copolymers made containing non-alkyl cyclohexane bisphenols and blends of alkyl cyclohexyl bisphenol containing polycarbonates with non-alkyl cyclohexyl bisphenol polycarbonates, are supplied by Bayer Co. under the APEC trade name. The preferred bisphenol compound is bisphenol A.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl)carbonate, and di(naphthyl) carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates, as well as blends of linear polycarbonate and a branched polycarbonate may also be used in the data storage device. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, or combinations comprising at least one of the foregoing branching agents. Examples of suitable branching agents include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate in the binder composition.

In one embodiment, the polycarbonate may be produced by a melt polycondensation reaction between a dihydroxy compound and a carbonic acid diester. Examples of suitable carbonic acid diesters that may be utilized to produce the polycarbonates are diphenyl carbonate, bis(2,4-dichlorophenyl) carbonate, bis(2,4,6-trichlorophenyl) carbonate, bis(2-cyanophenyl) carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, dicyclohexyl carbonate, or the like, or combinations comprising at least one of the foregoing carbonic acid diesters. The preferred carbonic acid diester is diphenyl carbonate.

A suitable number average molecular weight for the polycarbonate is about 3,000 to about 1,000,000 grams/mole (g/mole). In one embodiment, it is desirable for the number average molecular weight of the polycarbonate to be about 10,000 to about 100,000 g/mole. In another embodiment, it is desirable for the number average molecular weight of the polycarbonate to be about 20,000 to about 75,000 g/mole. In yet another embodiment, it is desirable for the number average molecular weight of the polycarbonate to be about 25,000 to about 35,000 g/mole.

Cycloaliphatic polyesters suitable for use in the binder composition are those that are characterized by optical transparency, improved weatherability and low water absorption. It is also generally desirable that the cycloaliphatic polyesters have good melt compatibility with the polycarbonate resins since the polyesters can be mixed with the polycarbonate resins for use in the binder composition. Cycloaliphatic polyesters are generally prepared by reaction of a diol with a dibasic acid or an acid derivative.

The diols used in the preparation of the cycloaliphatic polyester resins for use in the binder composition are straight chain, branched, or cycloaliphatic, preferably straight chain or branched alkane diols, and may contain from 2 to 12 carbon atoms. Suitable examples of diols include ethylene glycol, propylene glycol, e.g., 1,2- and 1,3-propylene glycol; butane diol, i.e., 1,3- and 1,4-butane diol; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, ore the like, or a combination comprising at least one of the foregoing diols. If 1,4-cyclohexane dimethanol is to be used as the diol component, it is generally preferred to use a mixture of cis- to trans-isomers in ratios of about 1:4 to about 4:1. Within this range, it is generally desired to use a ratio of cis- to trans-isomers of about 1:3.

The diacids useful in the preparation of the cycloaliphatic polyester resins are aliphatic diacids that include carboxylic acids having two carboxyl groups each of which are attached to a saturated carbon in a saturated ring. Examples of suitable cycloaliphatic acids include decahydro naphthalene dicarboxylic acid, norbornene dicarboxylic acids, bicyclo octane dicarboxylic acids. Exemplary cycloaliphatic diacids are 1,4-cyclohexanedicarboxylic acid and trans-1,4-cyclohexanedicarboxylic acids. Linear aliphatic diacids are also useful provided the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid of naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained in which the carboxylic acid groups are in cis- or trans-positions. The cis- and trans-isomers can be separated by crystallization with or without a solvent or by distillation. Mixtures of the cis- and trans-isomers may also be used, and preferably when such a mixture is used, the trans-isomer can comprise at least about 75 wt % and the cis-isomer can comprise the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Examples of suitable chemical equivalents for the diacids are alkyl esters, e.g., dialkyl esters, diaryl esters, anhydrides, acid chlorides, acid bromides, or the like, or combinations comprising at least one of the foregoing chemical equivalents. Exemplary chemical equivalents comprise the dialkyl esters of the cycloaliphatic diacids, with the most desirable being the dimethyl ester of the acid, particularly dimethyl-trans-1,4-cyclohexanedicarboxylate. Dimethyl-1,4-cyclohexanedicarboxylate can be obtained by ring hydrogenation of dimethylterephthalate.

The polyester resins can be obtained through the condensation or ester interchange polymerization of the diol or diol chemical equivalent component with the diacid or diacid chemical equivalent component and has recurring units of the formula (IX):

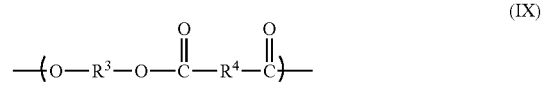

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^4$ is an alkyl or a cycloaliphatic radical which is the decarboxylated residue derived from a diacid, with the proviso that at least one of $R^3$ or $R^4$ is a cycloalkyl group.

A preferred cycloaliphatic polyester is poly(1,4-cyclohexane-dimethanol-1,4-cyclohexanedicarboxylate) having recurring units of formula (X)

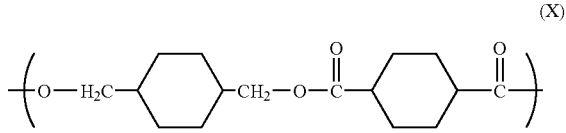

wherein in the formula (VII) $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester resins can be generally made in the presence of a suitable catalyst such as a tetra(2-ethyl hexyl)titanate, in a suitable amount, typically about 50 to 400 ppm of titanium based upon the total weight of the final product.

Also contemplated herein are copolyesters comprising about 0.5 to about 30 percent by weight (wt %), of units derived from aliphatic acids and/or aliphatic polyols with the remainder of the polyester being a resorcinol aryl polyesters derived from aromatic diols and aromatic polyols.

Polyarylates that can be used in the binder composition refers to polyesters of aromatic dicarboxylic acids and bisphenols. Polyarylate copolymers including carbonate linkages in addition to the aryl ester linkages, known as polyester-carbonates, are also suitable. These aryl esters may be used alone or in combination with each other or more preferably in combination with bisphenol polycarbonates. These organic polymers can be prepared in solution or by melt polymerization from aromatic dicarboxylic acids or their ester forming derivatives and bisphenols and their derivatives.

Examples of aromatic dicarboxylic acids represented by the decarboxylated residue $R^2$ are isophthalic or terephthalic acid, 1,2-di(p-carboxyphenyl)ethane, 4,4'-dicarboxydiphenyl ether, 4,4'bisbenzoic acid, and mixtures thereof. All of these acids contain at least one aromatic nucleus. Acids containing fused rings can also be present, such as in 1,4- 1,5- or 2,6-naphthalene dicarboxylic acids. The preferred dicarboxylic acids are terephthalic acid, isophthalic acid, naphthalene dicarboxylic acid, or the like, or a combination comprising at least one of the foregoing dicarboxylic acids.

Blends of organic polymers may also be used as the binder composition for the data storage devices. Preferred organic polymer blends are polycarbonate (PC)-poly(1,4-cyclohexane-dimethanol-1,4-cyclohexanedicarboxylate) (PCCD), PC-poly(cyclohexanedimethanol-co-ethylene terephthalate) (PETG), PC-polyethylene terephthalate (PET), PC-polybutylene terephthalate (PBT), PC-polymethylmethacrylate (PMMA), PC-PCCD-PETG, resorcinol aryl polyester-PCCD, resorcinol aryl polyester-PETG, PC-resorcinol aryl polyester, resorcinol aryl polyester-polymethylmethacrylate (PMMA), resorcinol aryl polyester-PCCD-PETG, or the like, or a combination comprising at least one of the foregoing.

Binary blends, ternary blends and blends having more than three resins may also be used in the polymeric alloys. When a binary blend or ternary blend is used in the polymeric alloy, one of the polymeric resins in the alloy may comprise about 1 to about 99 weight percent (wt %) based on the total weight of the composition. Within this range, it is generally desirable to have the one of the polymeric resins in an amount greater than or equal to about 20, preferably greater than or equal to about 30 and more preferably greater than or equal to about 40 wt %, based on the total weight of the composition. Also desirable within this range, is an amount of less than or equal to about 90, preferably less than or equal to about 80 and more preferably less than or equal to about 60 wt % based on the total weight of the composition. When ternary blends of blends having more than three polymeric resins are used, the various polymeric resins may be present in any desirable weight ratio.

Examples of suitable thermosetting polymers that may be used in the binder composition are polysiloxanes, phenolics, polyurethanes, epoxies, polyesters, polyamides, polyacrylates, polymethacrylates, or the like, or a combination comprising at least one of the foregoing thermosetting polymers. In one embodiment, the organic material can be a precursor to a thermosetting polymer.

As noted above, the photoactive material is a photochromic dye. The photochromic dye is one that is capable of being written and read by electromagnetic radiation. It is desirable to use photochromic dyes that can be written and read using actinic radiation i.e., from about 350 to about 1,100 nanometers. The wavelengths at which writing and reading are accomplished are about 400 nanometers to about 800 nanometers. In one embodiment, the writing and reading are accomplished at a wavelength of about 400 to about 600 nanometers. In another embodiment, the writing and reading are accomplished at a wavelength of about 400 to about 550 nanometers. Exemplary wavelengths at which writing and reading are accomplished are about 405 nanometers and about 532 nanometers. Suitable examples of photochromic dyes are a diarylethene or a nitrone.

An exemplary diarylethylene compound can be represented by formula (XI)

(XI)

wherein n is 0 or 1; $R^1$ is a single covalent bond ($C_0$), $C_1$-$C_3$ alkylene, $C_1$-$C_3$ perfluoroalkylene, oxygen; or —N(CH$_2$)$_x$ CN wherein x is 1, 2, or 3; when n is 0, Z is $C_1$-$C_5$ alkyl, $C_1$-$C_5$ perfluoroalkyl, or CN; when n is 1, Z is CH$_2$, CF$_2$, or C=O; Ar$^1$ and Ar$^2$ are each independently i) phenyl, anthracene, phenanthrene, pyridine, pyridazine, 1H-phenalene or naphthyl, substituted with 1-3 substituents wherein the substituents are each independently $C_1$-$C_3$ alkyl, $C_1$-$C_3$ perfluoroalkyl, or fluorine; or ii) represented by following formulas:

(XII)

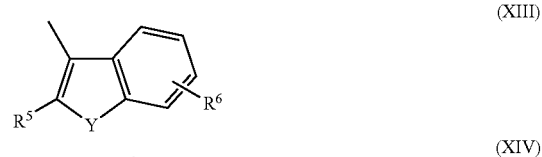

(XIII)

(XIV)

(XV)

wherein $R^2$ and $R^5$ are each independently $C_1$-$C_3$ alkyl or $C_1$-$C_3$ perfluoroalkyl; $R^3$ is $C_1$-$C_3$ alkyl, $C_1$-$C_3$ perfluoroalkyl, hydrogen, or fluorine; $R^4$ and $R^6$ are each independently $C_1$-$C_3$ alkyl, $C_1$-$C_3$ perfluoroalkyl, CN, hydrogen, fluorine, phenyl, pyridyl, isoxazole, —CHC(CN)$_2$, aldehyde, carboxylic acid, —($C_1$-$C_5$ alkyl)COOH or 2-methylenebenzo[d][1,3]dithiole; wherein X and Y are each independently oxygen, nitrogen, or sulfur, wherein the nitrogen is optionally substituted with $C_1$-$C_3$ alkyl or $C_1$-$C_3$ perfluoroalkyl; and wherein Q is nitrogen.

Examples of suitable diarylethenes that can be used as photoactive materials include diarylperfluorocyclopentenes, diarylmaleic anhydrides, diarylmaleimides, or a combination comprising at least one of the foregoing diarylethenes. The diarylethenes are present as open-ring or closed-ring isomers. In general, the open ring isomers of diarylethenes have absorption bands at shorter wavelengths. Upon irradiation with ultraviolet light, new absorption bands appear at longer wavelengths, which are ascribed to the closed-ring isomers. In general, the absorption spectra of the closed-ring isomers depend on the substituents of the thiophene rings, naphthalene rings or the phenyl rings. The absorption structures of the open-ring isomers depend upon the upper cycloalkene structures. For example, the open-ring isomers of maleic anhydride or maleimide derivatives show spectral shifts to longer wavelengths in comparison with the perfluorocyclopentene derivatives.

Examples of suitable diarylethene closed ring isomers include:

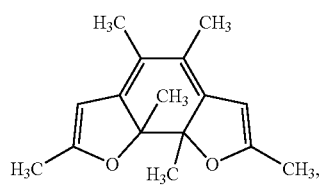
(XVI)

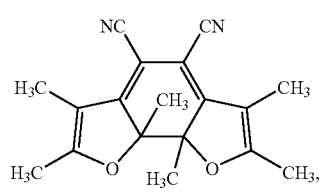
(XVII)

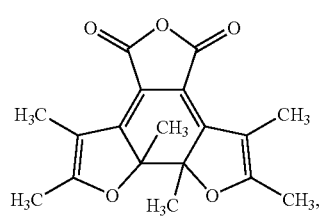
(XVIII)

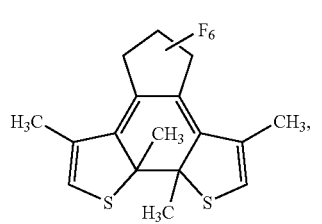
(XIX)

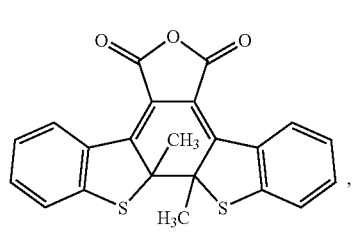
(XX)

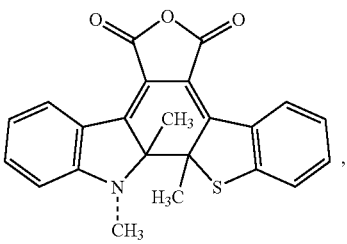
(XXI)

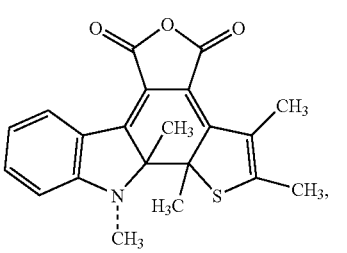
(XXII)

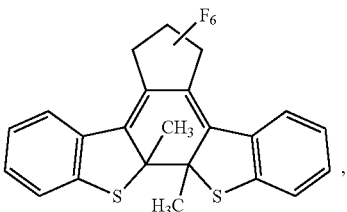
(XXIII)

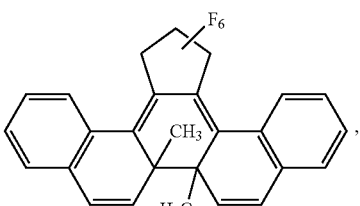
(XXIV)

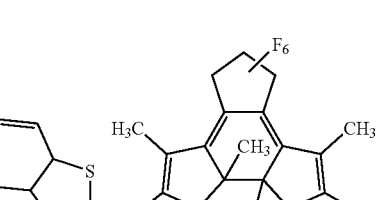
(XXV)

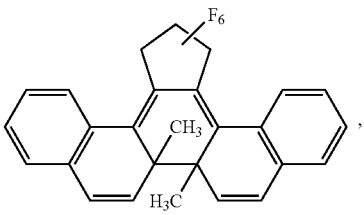
(XXVI)

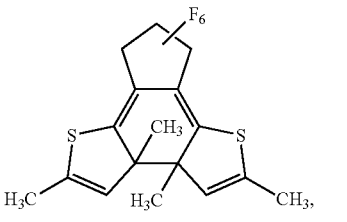
(XXVII)

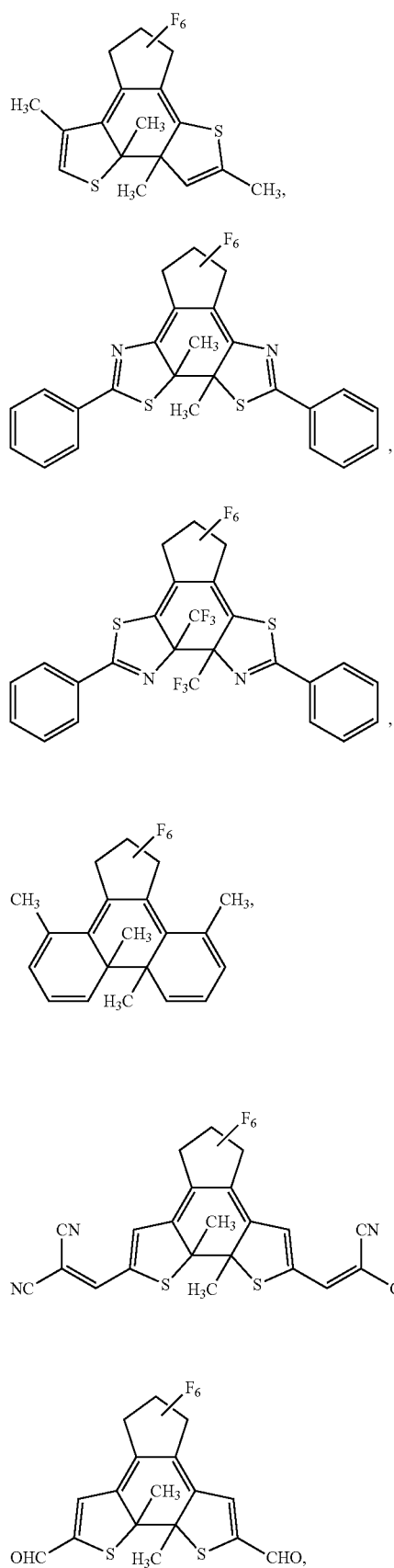
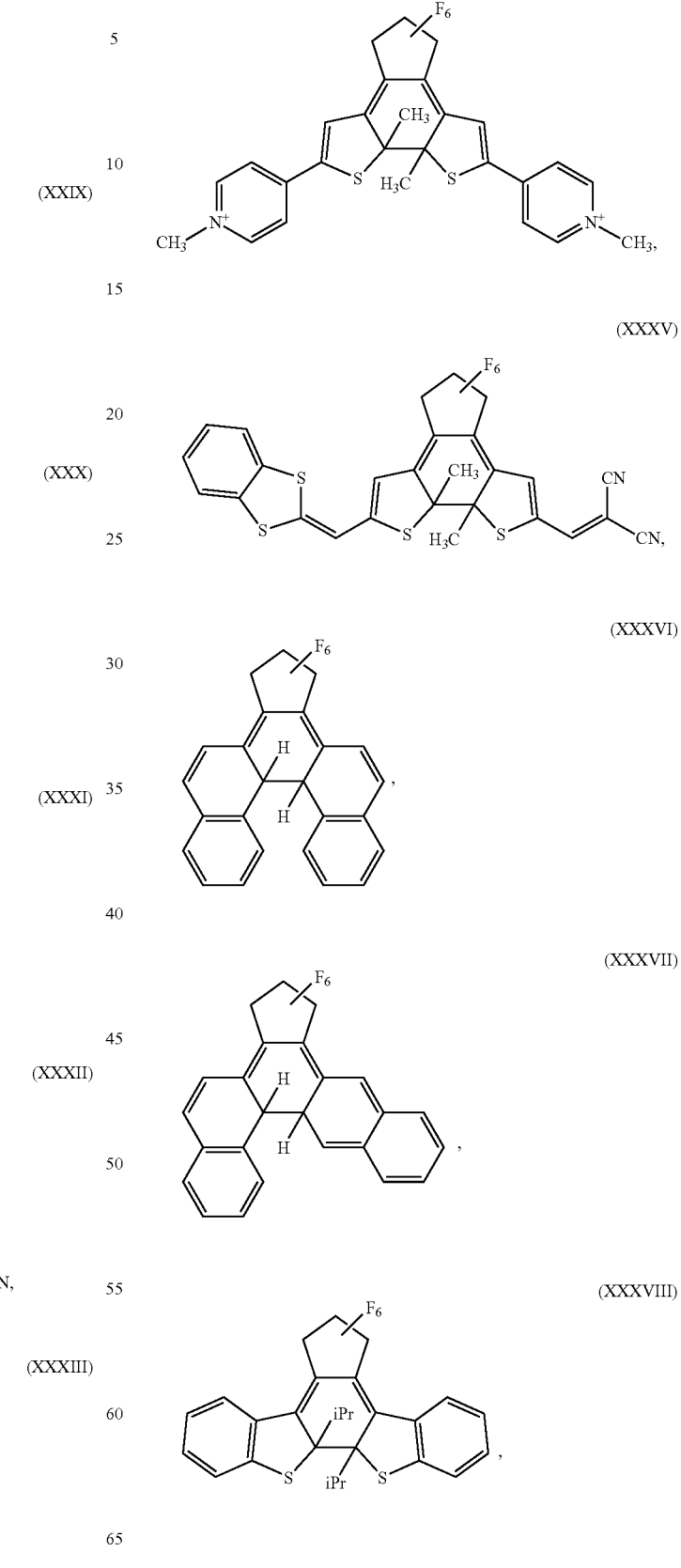
where iPr represents isopropyl;

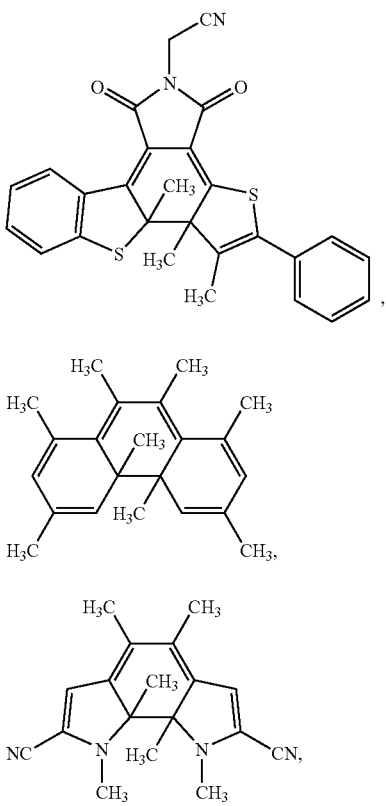
(XXXIX)

(XXXX)

(XXXXI)

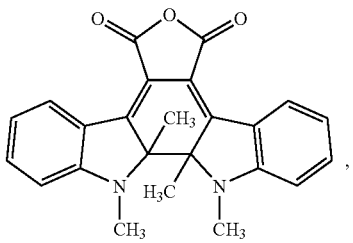
(XXXXIII)

or the like, or a combination comprising at least one of the foregoing diarylethenes.

Diarylethenes with five-membered heterocyclic rings have two conformations with the two rings in mirror symmetry (parallel conformation) and in $C_2$ (antiparallel conformation). In general, the population ratio of the two conformations is 1:1. In one embodiment, it is desirable to increase the ratio of the antiparallel conformation to facilitate an increase in the quantum yield, which is further described in detail below. Increasing the population ratio of the antiparallel conformation to the parallel conformation can be accomplished by covalently bonding bulky substituents such as the —($C_1$-$C_5$ alkyl)COOH substituent to diarylethenes having five-membered heterocyclic rings.

In another embodiment, the diarylethenes can be in the form of a polymer having the general formula (XXXXIV) below. The formula (XXXXIV) represents the open isomer form of the polymer.

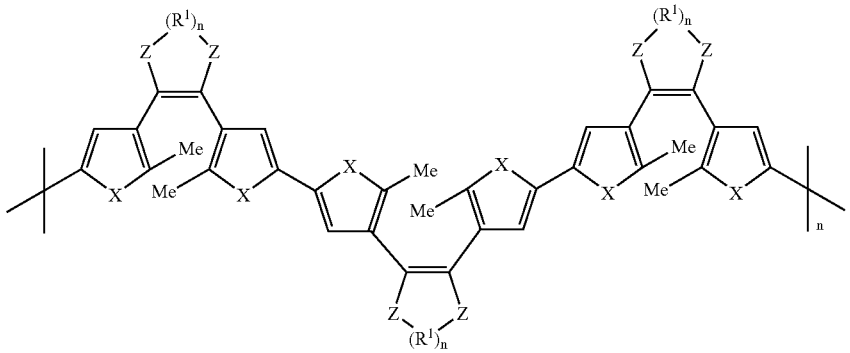
(XXXXIV)

-continued

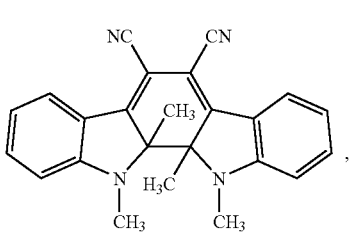
(XXXXII)

where Me represents methyl, $R^1$, X and Z have the same meanings as explained above in formulas (XI) through (XV) and n is any number greater than 1.

Polymerizing the diarylethenes can also be used to increase the population ratio of the antiparallel conformations to the parallel conformations.

The diarylethenes can be reacted in the presence of light. In one embodiment, an exemplary diarylethene can undergo a reversible cyclization reaction in the presence of light according to the following equation (I):

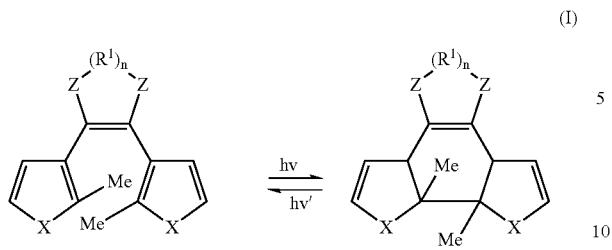

(I)

where X, Z $R^1$ and n have the meanings indicated above; and wherein Me is methyl. The cyclization reaction can be used to produce a hologram. The hologram can be produced by using radiation to react the open isomer form to the closed isomer form or vice-versa.

A similar reaction for an exemplary polymeric form of diarylethene is shown below in the equation (II)

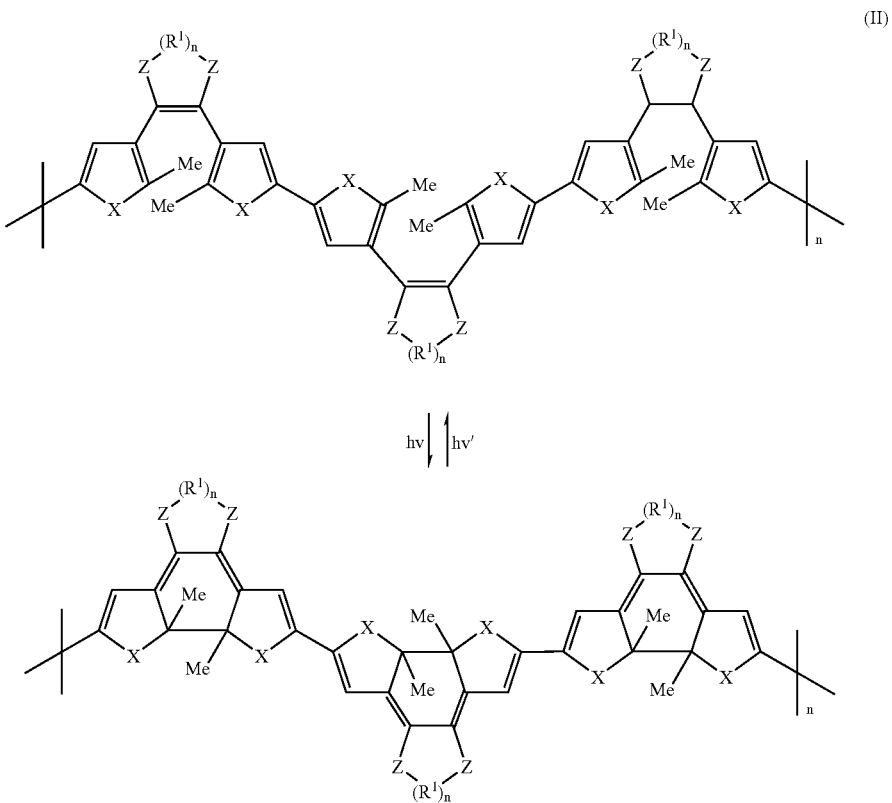

(II)

where X, Z $R^1$ and n have the meanings indicated above; and wherein Me is methyl.

As noted above, in yet another embodiment, a diarylethene can undergo a gated reaction in the presence of light. As noted above, diarylethenes with five-membered heterocyclic rings have two conformations with the two rings in mirror symmetry (parallel conformation) and in $C_2$ (antiparallel conformation). Photocyclization can proceed only from the antiparallel conformation. The photocyclization is prohibited when the compound is fixed in the mirror symmetry conformation. As can be seen in the equation (III) below, the formation of intramolecular hydrogen bonding fastens the compound in the parallel conformation thereby making the compound photochemically inactive. Heat can be used to break this intramolecular hydrogen bonding. Diarylethene compounds having special substituents that reversibly fix the conformation undergo gated photochromic reactions, according to the following equation (III):

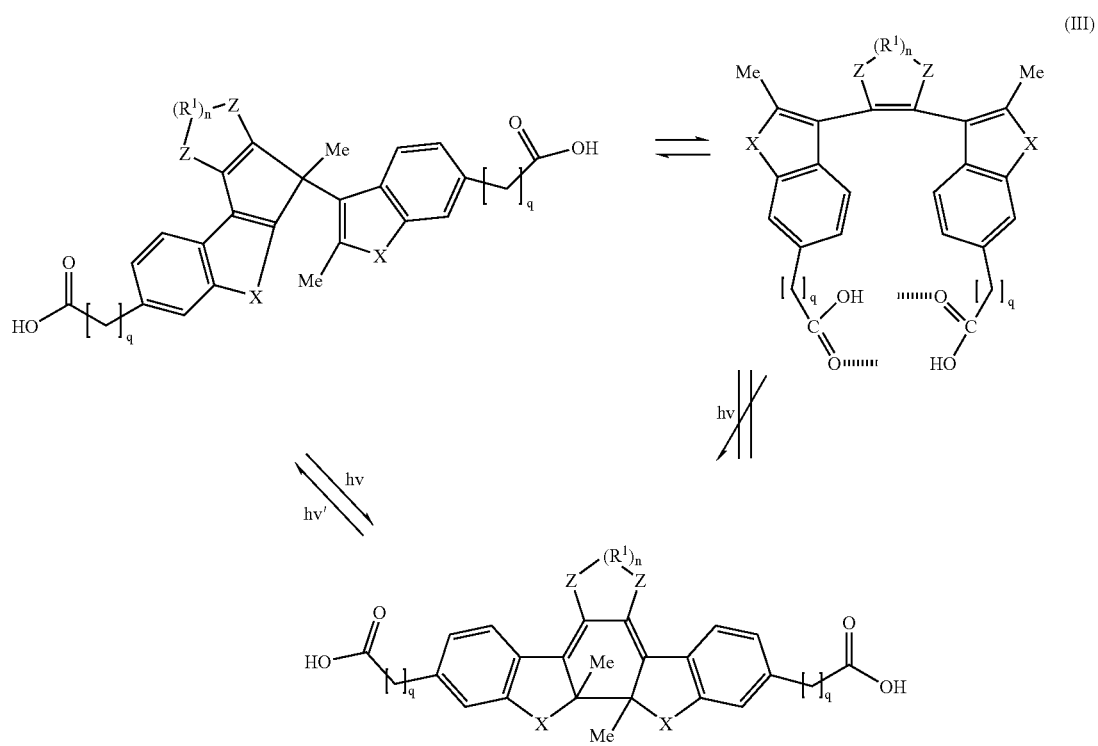

Equation (III) is termed a gated reaction and can preserve stored data even when readout operations are repeatedly conducted at the same wavelength as the writing operation. Thus by using diarylethenes in which gating is made to occur, the writing and reading can be conducted at the same wavelength.

Nitrones can also be used as photochromic dyes in the holographic storage media. Nitrones have the general structure shown in the formula (XXXXV):

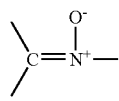

(XXXXV)

An exemplary nitrone generally comprises an aryl nitrone structure represented by the formula (XXXXVI):

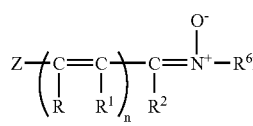

(XXXXVI)

wherein Z is $(R^3)_a$-Q-$R^4$— or $R^5$—; Q is a monovalent, divalent or trivalent substituent or linking group; wherein each of R, $R^1$, $R^2$ and $R^3$ is independently hydrogen, an alkyl or substituted alkyl radical containing 1 to about 8 carbon atoms or an aromatic radical containing 6 to about 13 carbon atoms; $R^4$ is an aromatic radical containing 6 to about 13 carbon atoms; $R^5$ is an aromatic radical containing 6 to about 20 carbon atoms which have substituents that contain hetero atoms, wherein the hetero atoms are at least one of oxygen, nitrogen or sulfur; $R^6$ is an aromatic hydrocarbon radical containing 6 to about 20 carbon atoms; X is a halo, cyano, nitro, aliphatic acyl, alkyl, substituted alkyl having 1 to about 8 carbon atoms, aryl having 6 to about 20 carbon atoms, carbalkoxy, or an electron withdrawing group in the ortho or para position selected from the group consisting of

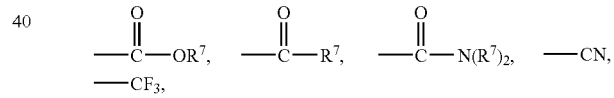

$R^7$ is a an alkyl radical having 1 to about 8 carbon atoms; a is an amount of up to about 2; b is an amount of up to about 3; and n is up to about 4.

As can be seen from formula (XXXXVI), the nitrones may be α-aryl-N-arylnitrones or conjugated analogs thereof in which the conjugation is between the aryl group and an α-carbon atom. The α-aryl group is frequently substituted, most often by a dialkylamino group in which the alkyl groups contain 1 to about 4 carbon atoms. The $R^2$ is hydrogen and $R^6$ is phenyl. Q can be monovalent, divalent or trivalent according as the value of "a" is 0, 1 or 2. Illustrative Q values are shown in the Table 1 below.

TABLE 1

| Valency of Q | Identity of Q |
|---|---|
| Monovalent | fluorine, chlorine, bromine, iodine, alkyl, aryl; |
| Divalent | oxygen, sulphur, carbonyl, alkylene, arylene. |
| Trivalent | nitrogen |

It is desirable for Q to be fluorine, chlorine, bromine, iodine, oxygen, sulfur or nitrogen.

Suitable examples of nitrones are α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, α-[2-(1-phenylpropenyl)]-N-phenylnitrone, or the like, or a combination comprising at least one of the foregoing nitrones. Aryl nitrones are preferred. An exemplary aryl nitrone is α-(4-diethylaminophenyl)-N-phenylnitrone.

Upon exposure to electromagnetic radiation, nitrones undergo unimolecular cyclization to an oxaziridine as shown in the structure (XXXXVII)

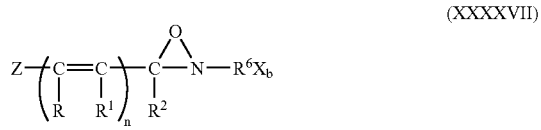

(XXXXVII)

wherein R, $R^1$, $R^2$, $R^6$, n, $X_b$ and Z have the same meaning as denoted above for the structure (XXXXVI).

In one embodiment, in one method of manufacturing the holographic data storage media, the photoactive material is disposed upon a first film that comprises an organic polymer. The first film behaves as a substrate upon which is disposed the photoactive material. The photoactive material can be disposed upon the first film in the form of a complete or partial layer. In yet another embodiment, a second film is disposed upon a surface of the photoactive material opposed to the surface in contact with the first film. The first and the second films can be molded or cast from solution. The second film can be disposed upon the surface of the photoactive material by molding. The photoactive material is then coated onto the surface of the first film or the surface of the second film or upon the opposing surfaces of both the first film and the second film.

Examples of molding can include injection molding, blow molding, compression molding, vacuum forming, or the like. Examples of processes by which the photoactive material can be coated onto the surface of the film are by brush painting, dip coating, spray painting, spin coating, or the like.

When a photochromic material is disposed upon a film to form the holographic data storage as described above, it is generally desirable to have the film having a thickness of about 1 to about 100,000 micrometers (μm). In one embodiment, it is desirable to have a thickness of about 2 to about 10,000 μm. In another embodiment, it is desirable to have a thickness of about 3 to about 1,000 μm. In yet another embodiment, it is desirable to have a thickness of about 7 to about 500 μm.

In another embodiment, in another method of manufacturing the holographic data storage media, the photoactive material can be incorporated into the organic polymer in a mixing process to form a data storage composition. Following the mixing process, the data storage composition is injection molded into an article that can be used as holographic data storage media. The injection molded article can have any geometry. Examples of suitable geometries are circular discs, square shaped plates, polygonal shapes, or the like.

The mixing processes by which the photoactive material can be incorporated into the organic polymer involves the use of shear force, extensional force, compressive force, ultrasonic energy, electromagnetic energy, thermal energy or combinations comprising at least one of the foregoing forces or forms of energy and is conducted in equipment wherein the aforementioned forces are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, baffles, or combinations comprising at least one of the foregoing.

The mixing can be conducted in machines such as a single or multiple screw extruder, a Buss kneader, a Henschel, a helicone, an Eirich mixer, a Ross mixer, a Banbury, a roll mill, molding machines such as injection molding machines, vacuum forming machines, blow molding machine, or then like, or a combination comprising at least one of the foregoing machines.

A holographic composition generally comprises about 0.1 to about 50 weight percent (wt %), based on the total weight of the holographic composition. In one embodiment, the holographic composition comprises about 1 to about 40 wt %, based upon the total weight of the holographic composition. In another embodiment, the holographic composition comprises about 2 to about 20 wt %, based upon the total weight of the holographic composition. In yet another embodiment, the holographic composition comprises about 3 to about 10 wt %, based upon the total weight of the holographic composition.

After the molding of the data storage media the data can be stored onto the media by irradiating the media with electromagnetic energy having a first wavelength. In one embodiment, the irradiation facilitates the conversion of the open form of the isomer to the closed form of the isomer (cyclization) of the photochromic dye thereby creating a hologram into which the data is encoded. In another embodiment, the irradiation facilitates the conversion of the closed form of the isomer to the open form of the isomer of the photochromic dye thereby creating a hologram into which the data is encoded.

In order to recover (read) the data, the media is irradiated with electromagnetic energy having a second wavelength. As noted above the first and second wavelengths can be between 350 and 1,100 nm. In one embodiment, the first wavelength is not equal to the second wavelength. In another embodiment, the wavelength used to store the data is the same as the wavelength used to read the data. In such an embodiment, the first wavelength is equal to the second wavelength.

In one embodiment, the photochromic dye after being reacted can be converted to a non-photochromic state so that any written data cannot be destroyed. The conversion of the photochromic dye to the non-photochromic state can be induced by an electric field, by a third wavelength, by a photoacid generator or by a combination comprising at least one of the foregoing.

An example of a suitable holographic data storage process to create holographic storage media of the present disclosure is set forth in FIG. 1a. In this configuration, the output from a laser 10 is divided into two equal beams by beam splitter 20. One beam, the signal beam 40, is incident on a form of spatial light modulator (SLM) or deformable mirror device (DMD) 30, which imposes the data to be stored in signal beam 40. This device is composed of a number of pixels that can block or transmit the light based upon input electrical signals. Each pixel can represent a bit or a part of a bit (a single bit may consume more than one pixel of the SLM or DMD 30) of data to be stored. The output of SLM or DMD 30 is then incident on the storage medium 60. The second beam, the reference beam 50, is transmitted all the way to storage medium 60 by reflection off first mirror 70 with minimal distortion. The two beams are coincident on the same area of storage medium 60 at different angles. The net result is that the two beams create an interference pattern at their intersection in the storage medium 60. The interference pattern is a unique function of the data imparted to signal beam 40 by SLM or DMD 30. At least a portion of the photoactive monomer undergoes cyclization, which leads to a modification of the refractive index in the region exposed to the laser light and fixes the interference pattern, effectively creating a grating in the storage medium 60.

Figure 1B:
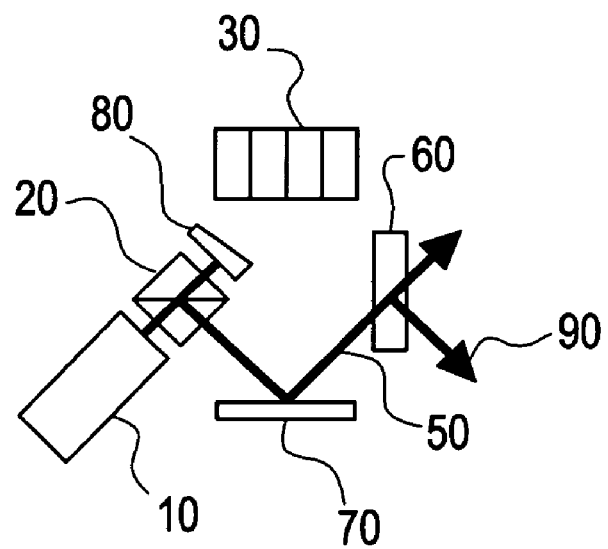

For reading the data, as depicted in FIG. 1b, the grating or pattern created in storage medium 60 is simply exposed to reference beam 50 in the absence of signal beam 40 by blocking signal beam 40 with a shutter 80 and the data is reconstructed in a recreated signal beam 90.

Figure 2A:
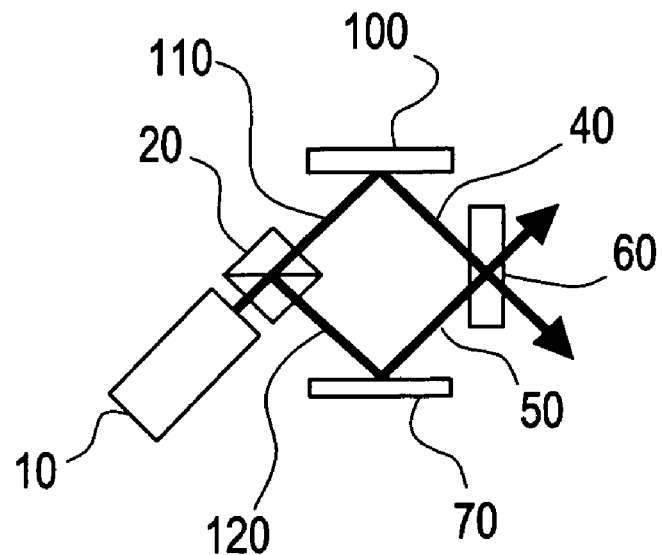
FIG. 2 is a schematic representation of a diffraction efficiency characterization setup for (a) writing plane wave holograms and (b) measuring diffracted light.
Figure 2B:
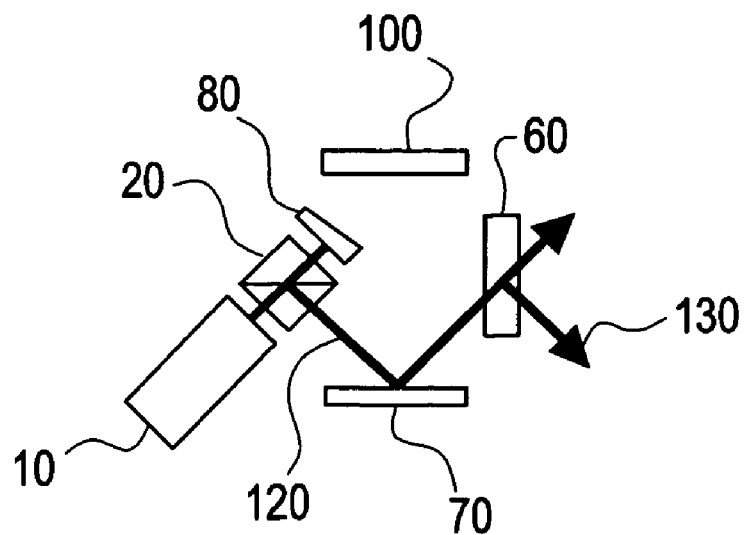

In order to test the characteristics of the material, a diffraction efficiency measurement can be used. A suitable system for these measurements is shown in FIG. 2a. This setup is very similar to the holographic storage setup; however, there is no SLM or DMD, but instead, a second mirror 100. The laser 10 is split into two beams 110 and 120 that are then interfered in storage medium 60 creating a plane wave grating. As depicted in FIG. 2b, one of the beams is then turned off or blocked with shutter 80 and the amount of light diffracted by the grating in storage medium 60 is measured. The diffraction efficiency is measured as the power in diffracted beam 130 versus the amount of total power incident on storage medium 60. More accurate measurements may also take into account losses in storage medium 60 resulting from reflections at its surfaces and/or absorption within its volume.

Figure 3:
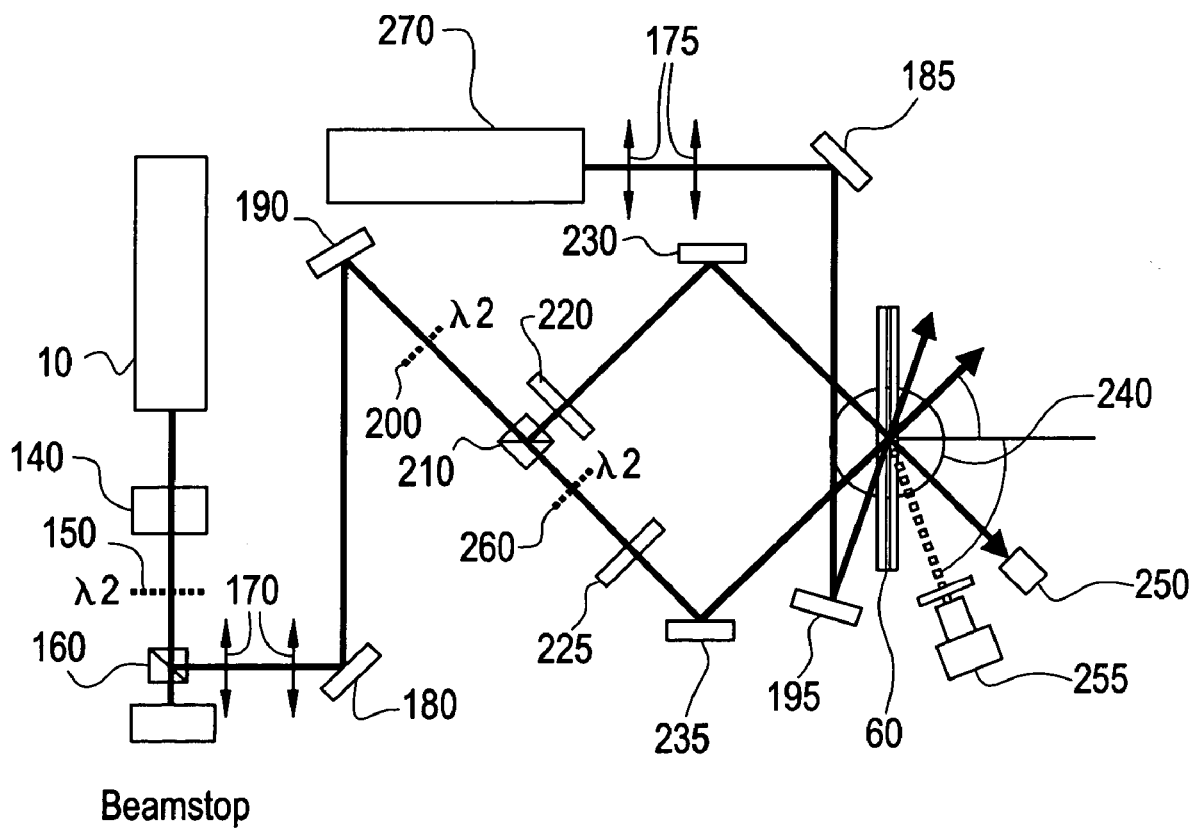
FIG. 3 is a schematic representation of a holographic plane-wave characterization system.

Alternatively, a holographic plane-wave characterization system may be used to test the characteristics of the medium, especially multiplexed holograms. Such a system can provide the M/# for a given sample, which is the metric used to characterize the ultimate dynamic range or information storage capacity of the sample as measured by the maximum number and efficiency of multiplexed holograms stored in the medium. A suitable system for these measurements is shown in FIG. 3. In this setup the output from first laser 10 is passed through a first shutter 140 for read/write control, a combination of a first half-wave plate 150, and a first polarizing beam splitter 160 for power control. The light is then passed through a first two-lens telescope 170 to adjust the beam size and reflected off first mirror 180 followed by second mirror 190 to transport the beam into the measurement area. The light is then passed through a second half-wave plate 200 and a second polarizing beam splitter 210 to split the beam in two and to control the power in each of the two beams. The beam reflected off of beam splitter 210 is then passed through a second shutter 220, which enables independent on/off control of the power in the first beam. The first beam is then reflected off of a third mirror 230 and is incident on medium 60, which is mounted on a rotation stage 240. The light from the first beam transmitted through medium 60 is collected into a first detector 250. The second beam is passed through a third half-wave plate 260 to rotate its polarization into the same direction as the first beam and then through a third shutter 225 to provide on/off control of the second beam. The second beam is then reflected off of fourth mirror 235 and is incident on medium 60. For measuring the in-situ dynamic change in the sample during exposure, a second laser 270 is passed through a second two-lens telescope 175, reflected off of fifth mirror 185 and then sixth mirror 195, and is then coincident on medium 60 at the same location as the first and second beams. The diffracted beam is then collected into second detector 255.

The holographic storage medium may be utilized in conjunction with a process whereby light of one wavelength from a laser is utilized to write the data into the holographic storage medium, while light of the same or a different wavelength is utilized to read the data. Thus, the wavelength employed for writing the data is a function of the specific photoactive material used. The holographic storage medium can be used for single bit type data storage. It can also be used for data storage when multiple layers are stored in a given volume.

As one skilled in the art will appreciate, different molecules will have widely differing absorption profiles (broader, narrower, etc.). Thus, the wavelengths utilized for writing and reading the holographic storage media of the present disclosure will depend upon the light source, and the specific photoactive material.

The present disclosure is illustrated by the following non-limiting example.

EXAMPLE

A solution of 202 milligrams (mg) of cis-1,2-dicyano-bis-(2,4,5-trimethyl-thienyl)ethene in 1.5 milliliters (mL) of ether was added to 1 mL of vinyl terminated poly-methylphenylsiloxane in a reaction vessel. Ether was removed from the reaction vessel under a stream of nitrogen. Any remaining ether was removed under vacuum. To this solution, one drop of catalyst solution and 4 drops of crosslinker were added. The catalyst solution was prepared by dissolving one drop of platinum(0) 1,3-divinyltetramethyldisiloxane (in xylene) in 1 mL of vinyl terminated poly-methylphenylsiloxane. Hydromethylsiloxane-methylphenylsiloxane copolymer was used as the crosslinker. After mixing for 10 minutes, samples were prepared by sandwiching 0.25 mL of the solution between glass slides, using 0.26 millimeter (mm) plastic spacers to maintain thickness. The samples were heated at 70° C. for 2 minutes (min) per side, exposed to UV (a Xenon UV curing bulb type B at 3 inch bulb height from sample) for 10 seconds and wrapped in foil until tested. The diffraction efficiency of this material was measured on the holographic test bed by recording a plane wave hologram.

The holographic composition is advantageous in that it permits manufacturing a holographic storage medium in an efficient and cost effective manner. It also allows for fast replication and can be handled by the end-user.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method for recording information in a holographic data storage media, the method comprising:
    irradiating a holographic data storage media that comprises a photoactive dye with an interference pattern, wherein the photoactive dye comprises a nitrone and wherein the media is capable of fixing an interference pattern within its volume to record holographic data; wherein the irradiation is conducted with electromagnetic energy having a wavelength of about 350 to about 1,100 nanometers; and reacting the photoactive dye to fix the interference pattern in the holographic data storage media, wherein the reacted photoactive dye does not revert back to an original form of the dye by thermal or photochromic means; and converting the reacted photoactive dye to a non-photochromic state, wherein the converting is induced by an electric field, or by light exposure of a photoacid generator, or by a combination of the foregoing.

2. The method of claim 1, wherein the photoactive dye comprises a nitrone in an amount of about 0.1 to about 50 weight percent, based upon the total weight of the holographic data storage media.

3. The method of claim 1, wherein the nitrone is an aryl nitrone.

4. The method of claim 1, wherein the nitrone has the structure

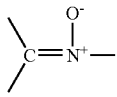

(XXXXV)

5. The method of claim 1, wherein the nitrone comprises an aryl nitrone structure represented by the formula (XXXXVI):

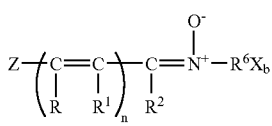

(XXXXVI)

wherein Z is $(R^3)_a$-Q-$R^4$— or $R^5$—; Q is a monovalent, divalent or trivalent substituent or linking group; wherein each of R, $R^1$, $R^2$ and $R^3$ is independently hydrogen, an alkyl or substituted alkyl radical containing 1 to about 8 carbon atoms or an aromatic radical containing 6 to about 13 carbon atoms; $R^4$ is an aromatic radical containing 6 to about 13 carbon atoms; $R^5$ is an aromatic radical containing 6 to about 20 carbon atoms which have substituents that contain hetero atoms, wherein the hetero atoms are at least one of oxygen, nitrogen or sulfur; $R^6$ is an aromatic hydrocarbon radical containing 6 to about 20 carbon atoms; X is a halo, cyano, nitro, aliphatic acyl, alkyl, substituted alkyl having 1 to about 8 carbon atoms, aryl having 6 to about 20 carbon atoms, carbalkoxy, or an electron withdrawing group in the ortho or para position selected from the group consisting of

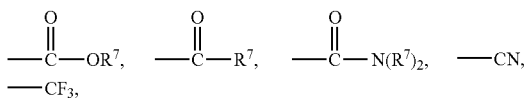

where $R^7$ is an alkyl radical having 1 to about 8 carbon atoms; a is an amount of up to about 2; b is an amount of up to about 3; and n is up to about 4.

6. The method of claim 1, wherein the nitrone is selected from the group consisting of: α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, α-[2-(1-phenylpropenyl)]-N-phenyl nitrone, and combinations comprising at least one of the foregoing nitrones.

7. The method of claim 1, wherein the nitrone is an aryl nitrone and wherein the nitrone undergoes unimolecular cyclization to an oxaziridine upon exposure to electromagnetic radiation.

8. The method of claim 7, wherein the nitrone upon undergoing unimolecular cyclization have the structure (XXXXVII)

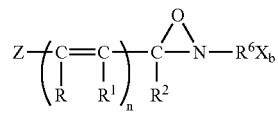

(XXXXVII)

wherein Z is $(R^3)_a$-Q-$R^4$— or $R^5$—; Q is a monovalent, divalent or trivalent substituent or linking group; wherein each of R, $R^1$, $R^2$ and $R^3$ is independently hydrogen, an alkyl or substituted alkyl radical containing 1 to about 8 carbon atoms or an aromatic radical containing 6 to about 13 carbon atoms; $R^4$ is an aromatic radical containing 6 to about 13 carbon atoms; $R^5$ is an aromatic radical containing 6 to about 20 carbon atoms which have substituents that contain hetero atoms, wherein the hetero atoms are at least one of oxygen, nitrogen or sulfur; $R^6$ is an aromatic hydrocarbon radical containing 6 to about 20 carbon atoms; X is a halo, cyano, nitro, aliphatic acyl, alkyl, substituted alkyl having 1 to about 8 carbon atoms, acyl having 6 to about 20 carbon atoms, carbalkoxy, or an electron withdrawing group in the ortho or para position selected from the group consisting of

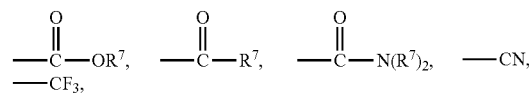

where $R^7$ is an alkyl radical having 1 to about 8 carbon atoms; a is an amount of up to about 2; b is an amount of up to about 3; and n is up to about 4.

9. The method of claim 7, wherein the aryl nitrone is α-(4-diethylaminophenyl)-N-phenylnitrone.

10. The method of claim 1, wherein the media comprises an optically transparent organic polymer.

11. The method of claim 10, wherein the organic polymer is a thermoplastic polymer, a thermosetting polymer, or a combination of a thermoplastic polymer with a thermosetting polymer.

12. The method of claim 11, wherein the thermoplastic polymer is a polyacrylate, a polymethacrylate, a polyester, a polyolefin, a polycarbonate, a polystyrene, a polyamideimide, a polyarylate, a polyarylsulfone, a polyethersulfone, a polyphenylene sulfide, a polysulfone, a polyimide, a polyetherimide, a polyetherketone, a polyether etherketone, a polyether ketone ketone, a polysiloxane, a polyurethane, a polyether, a polyether amide, a polyether ester, or a combination comprising at least one of the foregoing thermoplastic polymers.

13. The method of claim 11, wherein the thermosetting polymer is an epoxy, a phenolic, a polysiloxane, a polyester, a polyurethane, a polyamide, a polyacrylate, a polymethacrylate, or a combination comprising at least one of the foregoing thermosetting polymers.

14. The method of claim 11, wherein the thermoplastic polymer or the thermosetting polymer is chemically attached to said photoactive dye.

15. The media of claim 14, wherein the photoactive dye is part of a backbone of the thermoplastic polymer or the thermosetting polymer.

16. The method of claim 1, wherein the reacting results in a cyclization reaction.

17. The method of claim 1, wherein the irradiation results in a conversion of an open isomer form to a closed isomer form.

18. The method of claim 1, wherein the irradiation is conducted with electromagnetic energy having a first wavelength in a range of from about 400 to about 600 nanometers.

* * * * *